(12) United States Patent
Carroll et al.

(10) Patent No.: US 7,243,169 B2
(45) Date of Patent: Jul. 10, 2007

(54) METHOD, SYSTEM AND PROGRAM FOR OSCILLATION CONTROL OF AN INTERNAL PROCESS OF A COMPUTER PROGRAM

(75) Inventors: Matthew James Carroll, Scarborough (CA); Christian Marcelo Garcia-Arellano, Toronto (CA); Sam Sampson Lightstone, Toronto (CA); Maheswaran Surendra, Croton-on-Hudson, NY (US); Adam J. Storm, Thornhill (CA); Yixin Diao, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/864,208

(22) Filed: Jun. 8, 2004

(65) Prior Publication Data
US 2005/0273643 A1 Dec. 8, 2005

(51) Int. Cl.
*G06F 3/00* (2006.01)
*G06F 7/00* (2006.01)
*G06F 17/00* (2006.01)
*G06F 7/38* (2006.01)

(52) U.S. Cl. ............................. 710/15; 710/16; 710/17; 710/18; 710/19; 365/49; 377/19; 375/371; 714/1; 712/220; 707/101

(58) Field of Classification Search ............ 710/15–19; 365/49; 375/371; 377/19; 714/1; 712/220; 707/101
See application file for complete search history.

(56) References Cited

U.S. PATENT DOCUMENTS 4,517,684 A * 5/1985 Fennel .................. 377/19

5,426,672 A * 6/1995 Volejnik .................. 375/371

(Continued)

FOREIGN PATENT DOCUMENTS

JP  10051314 A * 2/1998 .................. 7/30

(Continued)

OTHER PUBLICATIONS

Myers, G., *A Fast Bit-Vector Algorithm for Approximate String Matching Based on Dynamic Programming*, Journal of the ACM, vol. 46, No. 3., May 1999, pp. 395-415.

(Continued)

*Primary Examiner*—Tammara Peyton
(74) *Attorney, Agent, or Firm*—Sughrue Mion, PLLC

(57) ABSTRACT

A method for reducing oscillations of an output value associated with a program to be operatively coupled to a data processing system. The program having an internal process configured to read an input value provided by the program, the input value adjusting a performance aspect of the internal process, the internal process configured to provide an output value reflecting changes in the internal process responsive to the input value, the output value readable by the program. The method including writing the output value to a queue stored in memory of the data processing system, selecting a portion of the queue, matching the selected portion of the queue with a predetermined pattern, selecting a type of adjustment to be made to the input value, the type of adjustment corresponding to the matched predetermined pattern, determining a new input value according to the selected type of adjustment, and providing the new value the internal process, the internal process providing a new output value having reduced oscillations responsive to the new input value.

28 Claims, 6 Drawing Sheets

U.S. PATENT DOCUMENTS

| | | | |
|---|---|---|---|
| 5,432,917 | A | 7/1995 | Parikh .................. 395/400 |
| 6,047,362 | A | 4/2000 | Zucker .................. 711/203 |
| 6,070,202 | A | 5/2000 | Minkoff et al. ............ 710/56 |
| 6,105,053 | A | 8/2000 | Kimmel et al. ............ 709/105 |
| 6,108,770 | A | 8/2000 | Chrysos et al. ............ 712/216 |
| 6,249,852 | B1 | 6/2001 | Benayon et al. ............ 711/170 |
| 6,446,182 | B1 | 9/2002 | Bouraoui et al. ............ 711/170 |
| 6,618,279 | B2 * | 9/2003 | Towler et al. ............ 365/49 |
| 2002/0046204 | A1 | 4/2002 | Hayes .................. 707/1 |
| 2002/0133742 | A1 | 9/2002 | Hsu et al. .................. 714/8 |
| 2002/0140077 | A1 | 10/2002 | King et al. ............ 257/687 |
| 2003/0005103 | A1 | 1/2003 | Narad et al. ............ 709/223 |

OTHER PUBLICATIONS

Semke, J., *Implementation Issues of the Autotuning Fair Share Algorithm*, Pittsburgh Supercomputing Center, Carnegie Mellon University, May 15, 2000, PSC Technical Report, # CMU-PSC-TR-2000-0002.

Semke, J., et al., *Automatic TCP Buffer Tuning*, ACM Sigcomm'98/ Computer Communication Review, vol. 28, No. 4, Oct. 1998, pp. 315-323.

Goldrian, G. et al, *Tracing of Large Amounts of Data by Using Main Memory as a Trace Buffer*, IBM Technical Disclosure Bulletin, vol. 40. No. 06, Jun. 1997.

Liu, L., *Method To Invalidate History Tables In Tightly Coupled Multiprocessors*, IBM Technical Disclosure Bulletin, vol. 33, No. 11, Apr. 1991. pp. 309-311.

Laeuger, J, et al, *Direct Strain Oscillation: A New Method Enabling Fast Oscillation Measurements at Extremely Small Deflection Angles and Torques*.

Weigle, E et al., *Comparison of TCP Automatic Tuning Techniques for Distributed Computing*, Proceedings of the 11th IEEE Intl. Symposium on High Performance Distributed Computing HPDC-11 2002.

Matsuo T. et al., *Scalable Automatic Buffer Tuning to Provide High Performance and Fair Service for TCP Connections*.

Stone, H.S., *Means for Updating and Searching Sparse Tables*, IBM Technical Disclosure Bulletin, vol. 32, No. 4A, Sep. 1989, pp. 217-222.

Semke, J., *PSC TCP Kernel Monitor*, May 16, 2000 PSC Technical Report # CMU-PSC-TR-2000-0001.

* cited by examiner

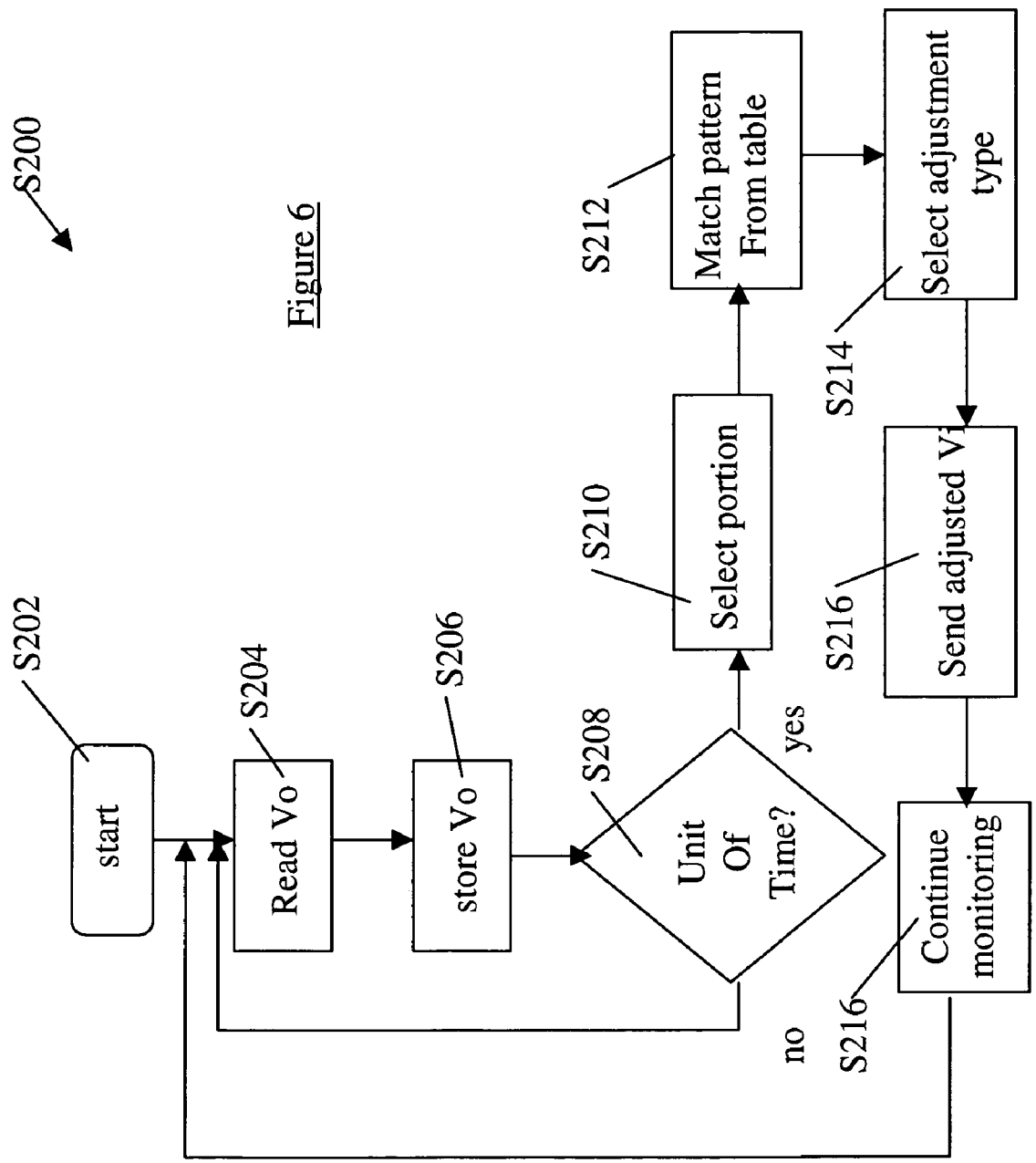

METHOD, SYSTEM AND PROGRAM FOR OSCILLATION CONTROL OF AN INTERNAL PROCESS OF A COMPUTER PROGRAM

FIELD OF THE INVENTION

The present invention relates to oscillation control of data processing systems, and more specifically to a method, a system and a computer program product for reducing oscillations of an output value generated by an internal process of a computer program.

BACKGROUND OF THE INVENTION

In the domain of on-line system tuning the notion of system oscillations are well studied. The concept is simply that as a system approaches stability it may have a tendency to oscillate between two (or more) "converging" solutions in an attempt to find the "best" solution. For example, one type of oscillation prone system is for an optimization of memory allocation in memory pools.

There are many known techniques which have been developed to avoid oscillations in system tuning. For example Eigen decomposition Filtering can be used for oscillation avoidance. However, the problem with this method is that the complexity of the system may increase as additional oscillating elements are added to the system. Therefore if the number of tuned items is large the system tuning time may be excessive. Additionally the method can be complicated and difficult to implement. This can be true of other advanced statistical oscillation control methods and therefore a method for oscillation control that is straightforward to implement yet effective is needed.

SUMMARY OF THE INVENTION

It is an object of the present invention to provide a system and method for oscillation control to obviate or mitigate at least some of the above mentioned disadvantages.

According to a first aspect of the present invention there is provided for a program to be operatively coupled to a data processing system, the program having an internal process configured to read an input value provided by the program, the input value adjusting a performance aspect of the internal process, the internal process configured to provide an output value reflecting changes in the internal process responsive to the input value, the output value readable by the program, a method for reducing oscillations of the output value, the method including writing the output value to a queue stored in memory of the data processing system, selecting a portion of the queue, matching the selected portion of the queue with a predetermined pattern, selecting a type of adjustment to be made to the input value, the type of adjustment corresponding to the matched predetermined pattern, determining a new input value according to the selected type of adjustment, and providing the new value the internal process, the internal process providing a new output value having reduced oscillations responsive to the new input value.

According to the second aspect of the present invention there is provided for a program to be operatively coupled to a data processing system, the program having an internal process configured to read an input value provided by the program, the input value adjusting a performance aspect of the internal process, the internal process configured to provide an output value reflecting changes in the internal process responsive to the input value, the output value readable by the program, a computer program product reducing oscillations of the output value, the computer program product including a computer readable medium encoding computer executable code for directing the data processing system, the computer executable code including computer executable code for writing the output value to a queue stored in memory of the data processing system, computer executable code for selecting a portion of the queue, computer executable code for matching the selected portion of the queue with a predetermined pattern, computer executable code for selecting a type of adjustment to be made to the input value, the type of adjustment corresponding to the matched predetermined pattern, computer executable code for determining a new input value according to the selected type of adjustment, and computer executable code for providing the new value the internal process, the internal process providing a new output value having reduced oscillations responsive to the new input value.

BRIEF DESCRIPTION OF THE DRAWINGS

A better understanding of these and other embodiments of the present invention can be obtained with reference to the following drawings and detailed description of the preferred embodiments, in which:

FIG. 6 provides an operation of the control system of FIG. 1.

It is noted that similar references are used in different figures to denote similar components.

DETAILED DESCRIPTION OF THE PREFERRED EMBODIMENT

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system, computer programming language, or data processing system and would not be a limitation of the present invention.

Figure 1:
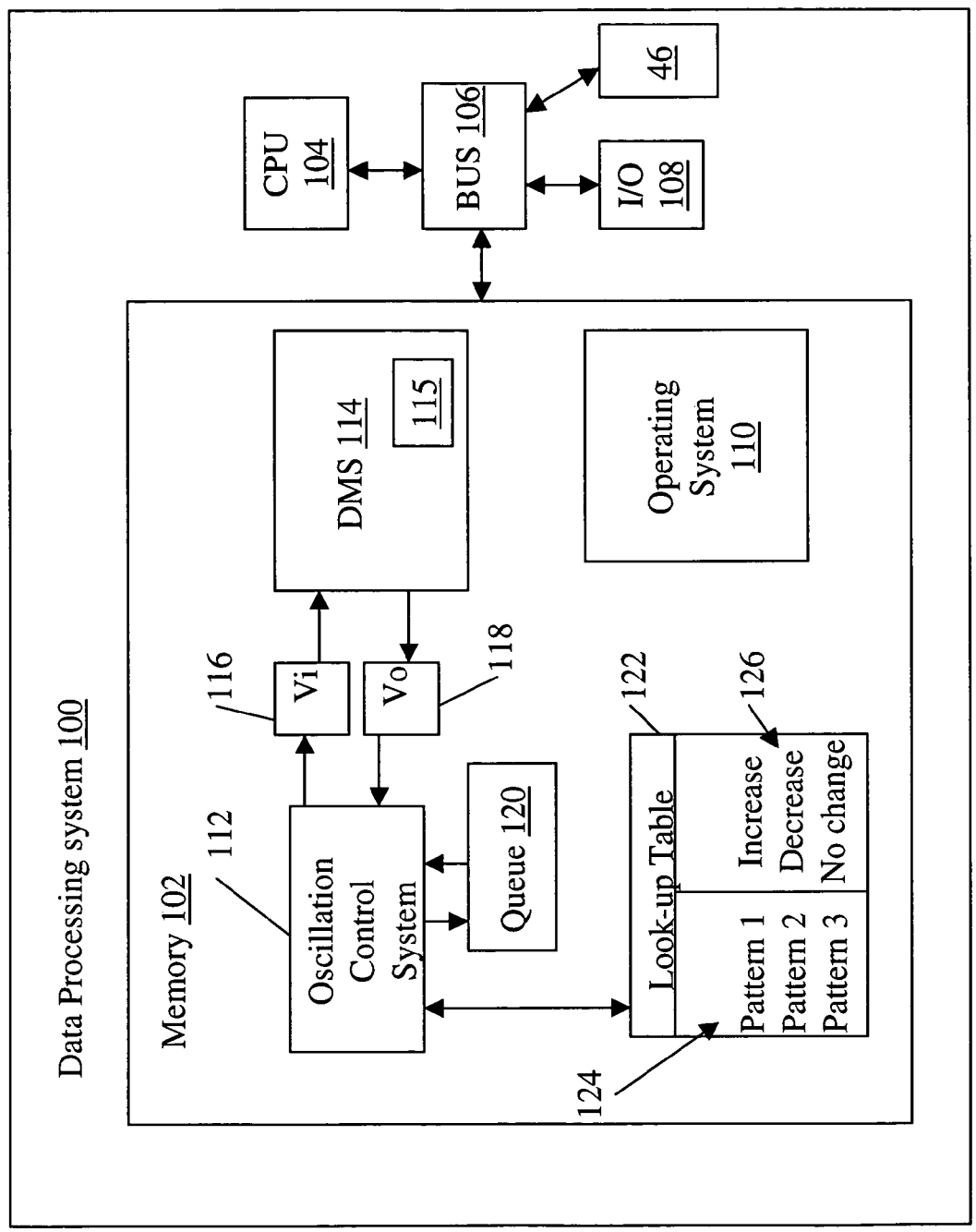
FIG. 1 is a block diagram of a data processing system coupled to a database management system.

Referring to FIG. 1, a data processing system 100 has a memory 102 for facilitating the interaction of an oscillation control system 112 with a database management system (DMS) 114, such that the DMS 114 is operatively coupled to the data processing system 100. The DMS 114 reads an input value Vi 116 from the oscillation control system 112 for adjusting a system process 115 that is monitored by the DMS 114. The system process 115 operates on the input value 116 to generate a corresponding output value Vo 118.

The DMS 114 also writes the output value 118 to the control system 112, the output value 118 being from the system process 115 as a result of the processed input value 116. Accordingly, the control system 112 interacts with the oscillation prone system process 115 for controlling oscillation of the output values 118, received from the DMS 114, based on the input values 116. The control system 112 adjusts the respective subsequent input values 116 to dampen oscillations determined in a series of the past sampled output values 118, which are stored by the control system 112 in a queue 120 as a sequence of bit values 24, 28 (see FIG. 2) representing the sampled output values 118. The degree of adjustment to the input values 116 by the control system 112 is based on the contents of a lookup table 122, which has predefined bit patterns 124 represented as various patterns (Pattern_1, Pattern_2, Pattern_3, etc. . . . ) as further described below. The lookup table 122 also has a corresponding predefined type of adjustment 126 to be made to the input value 116 (such as but not limited to increase, decrease, no change) based on a selected portion of the queue 120 of bit values matching one of the bit patterns 124, as further described below. Each of the bit patterns 124 has a corresponding adjustment type 126 in the table 122. The database management system is an example of a program having an internal process which provides an output value and an input value, and it is the oscillations of the output value that are to be reduced.

Referring again to FIG. 1, the data processing system 100 can have a user interface 108 for interacting with the control system 112, the user interface 108 being connected to the memory 102 via a BUS 106. The interface 108 is coupled to a processor 104 via the BUS 106, to interact with a user (not shown) to monitor or otherwise instruct the operation of the control system 112 via an operating system 110. The user interface 108 can include one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the processor 104. Further, it is recognized that the user interface 108 can include a computer readable storage medium 46 coupled to the processor 104 for providing instructions to the processor 104 and/or the control system 112. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid state memory card, or RAM provided in the memory 102. It should be noted that the above listed example computer readable mediums 46 can be used either alone or in combination.

Figure 2:
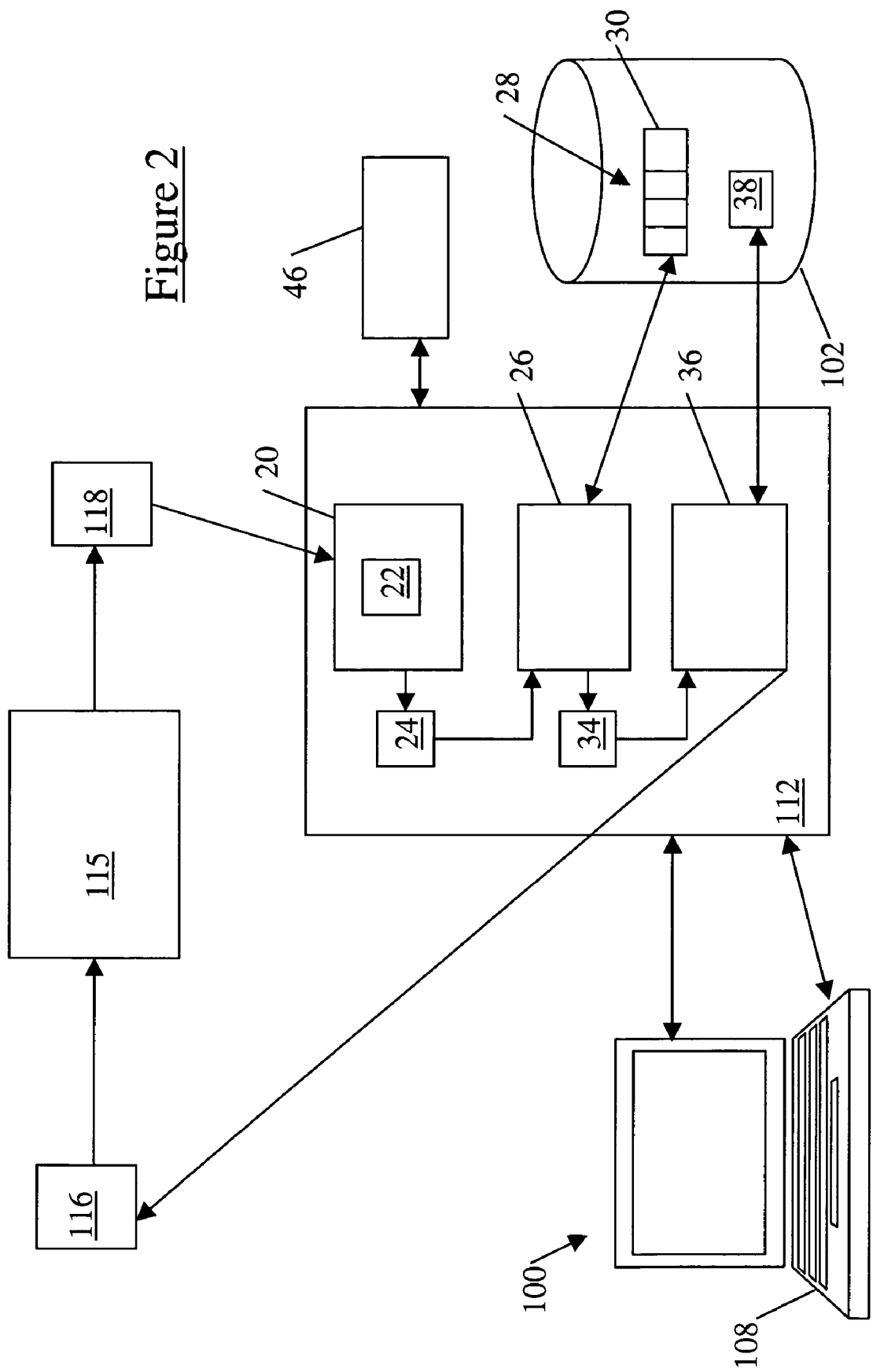
FIG. 2 shows an oscillation control system of FIG. 1 for an oscillation prone system process.

Referring to FIG. 2, the control system 112 assigns a predefined current bit value 24 (for example increasing=0, decreasing=1) to represent the current output value 118 and stores this current bit value 24 in the queue 120, which results in forming a bit vector 30 in the queue 120 having the current bit value 24 and a plurality of past bit values 28. The past bit values 28 represent the output values 118 previously received by the control system 112 from the DMS 114. The control system 112 uses a change module 20 for assigning the current bit value 24 to represent the current output value 118, by comparing the current output value 118 with the previous input value 116 to measure a magnitude of change 22 between the values 116, 118. The change module 20 determines whether the magnitude of change 22 represents an increase, decrease, or no change between the current output value 118 and the previous input value 116. The current bit value 24 is assigned to the current output value 118 to represent the corresponding change quantity 22 (e.g. increasing, decreasing). Accordingly, the change module 20 assigns to each output value 118 (of a sequence of output values 118) the predefined bit value 24, 28 representing the magnitude of change 22 between the respective output value 118 and the corresponding previous input value 116. The change module 20 updates the queue 120 to reflect the bit value 24 assigned to the current output value 118. It is recognized that the change module 20 could also compare the output value 118 with a previous output value 118 to calculate the magnitude of change 22.

Referring again to FIG. 2, the control system 112 also has a comparison module 26, which selects the portion of the queue 120 (e.g. the bit vector 30), on for example a periodic basis, and examines the current bit value 24 in relation to the sequence of the past bit values 28 of the bit vector 30, as selected from the queue 120. The comparison module 26 makes a determination as to an oscillation state or behavior/character represented by the bit values 24, 28 of the bit vector 30, by comparing the bit values 24,28 of the bit vector 30 to the predefined patterns 124 in the look-up table 122. The comparison module 26 then selects a corresponding type of adjustment 126 to be made to the next input value 116, such as but not limited to increase, decrease, and no change, as specified by the matching adjustment type 126 to the selected bit patterns 124.

Referring again to FIG. 2, the control system 112 also has an input module 36 for examining the type of adjustment 126 selected by the comparison module 26 and determines a suitable oscillation factor 38 (either increased, decreased, or unchanged) and then uses the oscillation factor 38 to calculate or otherwise update the next input value 116 to send to the system process 115 via the DMS 114. It is recognized that the application logic of the control system 112 can be implemented as hardware, software, or a combination thereof.

It is recognized that the oscillation control system 10 can be applied to any oscillation prone system process 115 that exhibits an oscillating solution, i.e. a solution that behaves in a shifting increasing/decreasing/constant manner towards one or more potential solutions. Example optimization systems can include such as but not limited to memory pools, sorting memory, SQL package memory, locking memory, and other memory configurations used for database operations. By example only, the following description is based on providing an optimum solution 14 for changing memory allocation for two linked memory pools 200, 202 (see FIG. 2). For greater certainty, it is recognized that the below described operation of the control system 112 is done for the memory pools 200, 202 by way of example only, and therefore the control system 112 is considered applicable to other oscillation prone system processes 115 in general.

Figure 3:
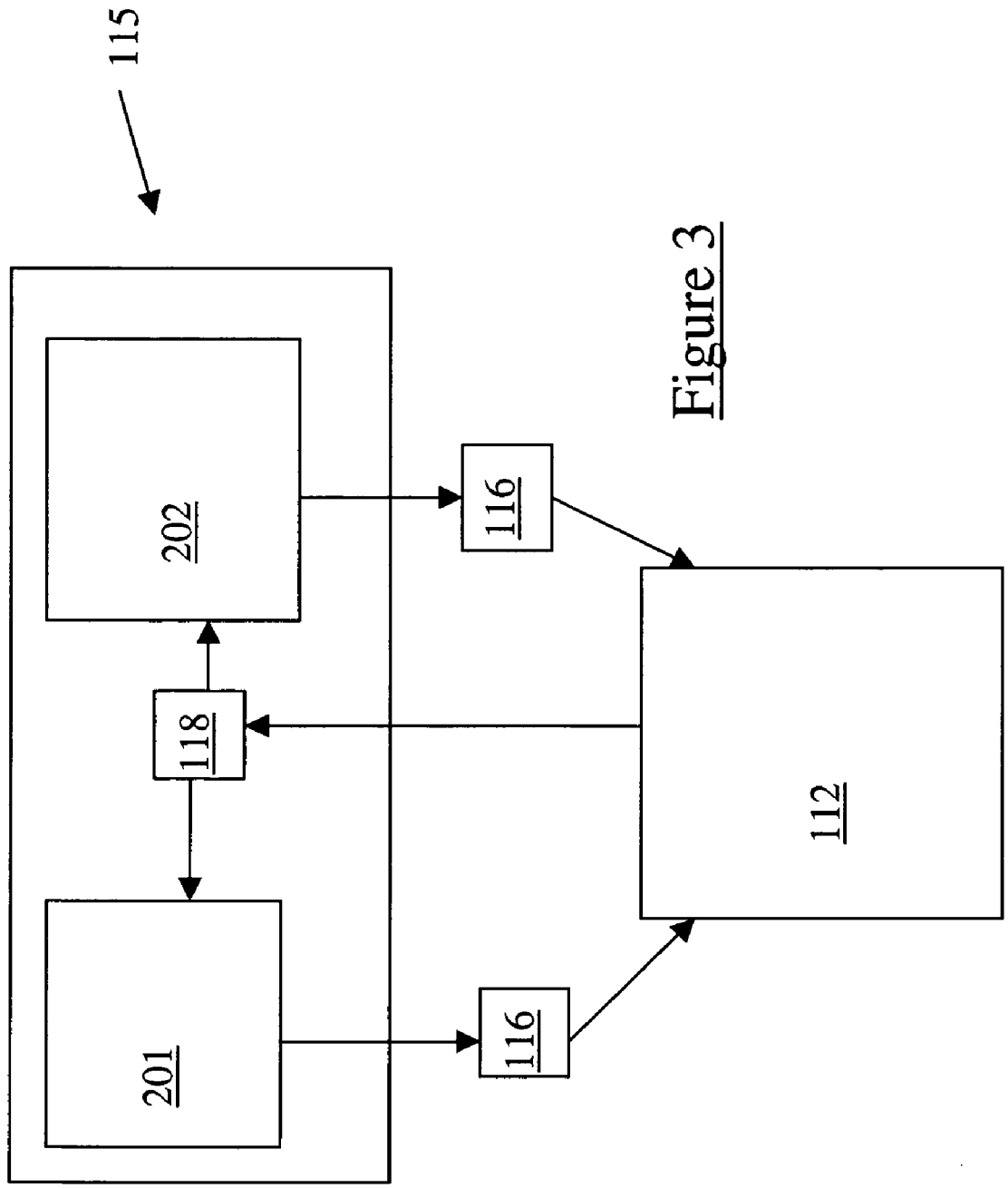
FIG. 3 shows an embodiment of the oscillation prone system process of FIG. 1.

Referring to FIG. 3, suppose we have the two memory pools 200, 202 representing the system process 115, each of which has a benefit B that would be achieved from the addition of extra memory. We wish to tune the system process 115 such that the benefit B to each pool 200,202 is minimized and both of the pools 200,202 have the same benefit B, however we have a constraint that we can not add additional memory to the system process 115 (e.g. since we presume that the addition of an infinite amount of memory to the system process 115 would reduce the benefit of both pools 200,202 to zero, for example benefit decreases as memory increases). We assume the benefit B of extra memory to pool 200 is B=5 and the benefit B to pool 202 is B=8. We also assume that we move memory between the pools 200,202 in increments of "C" pages.

As an aside, it is noted in the case where we are restricted to move memory in constant increments of C pages, suppose we move C pages from pool 200 to 202 in an attempt to make pool 202's benefit B decrease. This change in memory could then make pool 200's benefit 8 and pool 202's benefit 5. We can see how in such a situation when we then try to move the constant increment C pages back to pool 200, the process begins anew and oscillation of the output value 118 (see FIG. 1) results. In this instance, this moving of C pages from pool 200 to pool 202, and back, will continue indefinitely since the system process 115 has no way to know that within these constraints, pool 200 and pool 202 can never have the same benefit. This problem of the undesirable oscillation character in the above described example system process 115 can be solved if we constantly decrease the number of C pages that we are allowed to move in each memory allocation.

Referring again to FIGS. 2 and 3, the control system 112 maintains two values for each memory pool 200, 202 that are associated with magnitude of change quantity 22 determined by the change module 20. The first value, change pages (i.e. input value 116), is the amount of memory pages that the input module 36 has determined to reallocate (take from the memory pool 200,202 or give to the pool 200,202) at each stage of the optimization solution for the system process 115. Additionally, the input module 36 maintains an oscillation factor 38 which is a measure of the certainty that is felt at any given time (this is described in detail below) with regard to the convergence character of the output value 118. The comparison module 26 also maintains the bit vector 30 of the change history that includes past bit values 28. For example, in a binary bit system, the current bit value 24 of 1 can represent an increase in the memory pool size in a given interval of the solution and the current bit value of 0 can represent a decrease in size. Further, when no change in memory pool size is encountered for a given interval of the solution, the representative current bit value 24 can be set to the same value as the most recent bit value 28 in the bit sequence of the bit vector 30, which can help to identify step function type solution behavior.

For example, in the situation where the change quantity 22 denotes a sequence of increasing, increasing, increasing, unchanged, and decreasing (from current to oldest) in the output value 116, the corresponding current bit value 24 would be 1 and the past bit vector 30 representing the last four bit values 28 would be (0,0,1,1). The history module 26 uses the current bit value 24 to update the bit vector 30, thus making the current bit vector 30 now equal to (0,1,1,1). For greater certainty, the past bit values 28 would be (0,0,1,1) and the current bit value 24 would be 1 to make the current or updated bit vector 30 as (0,1,1,1). It is recognized that the quantity of the past bit values 28 could be one or more (representing one or more past intervals of the solution), as well as the bit values of 1 and 0 could be substituted for by other value schemes (for example increasing=0, decreasing=1). Further, it is recognized that the control system 112 could use number systems other than binary for representation of the change quantities 22 (such as but not limited to decimal, hexadecimal, etc. . . . ) depending upon the number of states (in the example case above only two values are assigned to the three optimization states of increasing, decreasing, and unchanged). Accordingly, it is recognized that more complex numbering systems and numbers of states could be used to describe the solution character of the system process 115, however these values would be placed in a collection of bit values 24, 28 representing a history of the solution, such as the bit vector 30.

It is recognized that use of the bit vector 30 having representative collections of historical bit values 24, 28 can be extended to any system whereby a distinction can be drawn between two types of change, i.e. it may be that we want to prevent oscillations between large changes and small changes and we define can the threshold by which the change is small or large. In general, the control system 112 is applicable in situations where the change quantity 22 can be used to define two or more types of actions. Another point is that you can have a larger number of states (small increase, large increase, small decrease, large decrease, etc. and as long as you define how to set the bit values (e.g. 1s and 0s for all of the possible transitions this system will still be valid).

Referring again to FIGS. 2 and 3, at each periodic interval of the system process 115 the comparison module 26 updates the bit vector 30 in the memory 102 to include the most recent history of change (such as but not limited to investigating 4 intervals). From this recent history the comparison module 26 determines if the memory pools 200,202 are in a "converging", "oscillating", or "unknown" state representation 34 (other terminology can be "desired", "undesired", or "undecided" respectively). This determination involves analyzing the updated bit vector 30. It is recognized that one or more "current bit values 24 could be compared with the bit vector 30, for example comparing sequences of bit vectors 30 (i.e. the first four values 28 with the previous next four values 28) with previously determined patterns 124 to determine the current system process 115 oscillation state represented by the type of adjustment 126 selected by the comparison module 26.

For example, with reference to the below, the predefined patterns 124 of the look-up table 122 correspond with oscillation types of the system process 115, which are attributable to the selected bit vector 30 (from the queue 120) as follows:

0000—converging
0001—unknown
0010—unknown
0011—unknown
0100—unknown
0101—oscillating
0110—oscillating
0111—converging
1000—converging
1001—oscillating
1010—oscillating
1011—unknown
1100—unknown
1101—unknown
1110—unknown
1111—converging, where alternating patterns 124 of ones and zeros (e.g. 1001,1010,0011,1100) are either considered as showing oscillating or potentially oscillating solution behavior, as compared to definitive patterns 124 such as 0111,0000,1111, 1000 that demonstrate a potential convergence behavior. It should be noted in the above predefined pattern 124 examples that the most recent current bit value 24 is on the right hand side of the bit vector 30. It is recognized that the bit vector 30 could contain as little as two bit values 24 and 28, or could be represented by such as but not limited to 2,4, 5,8, 16, 24, 32, 64 etc. . . . numbers of bits, basically from 2 bits to some computational practical maximum number of bits (for performance considerations) for the bit vector 30. The converging oscillation behavior, for example, could correspond to the "increase" adjustment type 126 of the table 122, while the oscillating behavior could correspond to the "decrease" adjustment type 126 and "unknown" to the no change adjustment type 126 (see FIG. 1). It is recognized that each of the bit values 24, 28 in the bit vector 30 represents a specific one of the output values 118 collected from the system process 115, each of the output values 118 corresponding to a paired one of the input values 116, the output values 118 being distributed over a series of time intervals representing a temporal sequencing of the output values 118 collected from the system process 115.

We can see that the "converging" patterns 124 indicate that the system process 115 has a definite goal (i.e. either increasing or decreasing the size of the memory pool 200, 202). Similarly the "oscillating" patterns 124 have a less focused goal (i.e. it seems as though the system process 115 is confused and unsure of how to resize the pool 200,202). Finally, in the "unknown" patterns 124 it is unclear whether or not the system process 115 has a well defined goal. If the memory pool 200,202 is in a "converging" state as identified by the comparison module 26, the input module 36 multiplies the oscillation factor 38 by a predefined quantity (such as but not limited to 2) to increase the oscillation factor 38 (for example to a practical maximum of 1.0). Conversely, if the system process 115 is in a "oscillating" state, the input module 36 divides the oscillation factor 38 by a predefined quantity (such as but not limited to 2) to decrease the oscillation factor 38 (for example to some practical minimum, say 0.00390625). Further, it is recognized that increase value and decrease value of the factor 38 do not necessarily have to be the same. If the system process 115 is in an "unknown" state the oscillation factor 38 can remain unchanged by the input module 36. Once the oscillation factor 38 is updated to reflect the selected pattern 124, then the input module 36 multiplies the old change input value 116 by the updated oscillation factor 38 to get the new number of pages (i.e. updated input value 116) to reallocate pool 200, 202 memory. Thus the oscillation factor 38 represents the certainty that we feel at any interval that we will make a correct decision when resizing the memory pool 200,202. If we are unsure how good the decision will be the oscillation factor 38 will be small. If we are very certain that the decision will be good the factor 38 will be large (i.e. 1.0).

Clearly the control system 112 can be efficient in that it may only use a few operations at each interval to calculate the new input value 116. Additionally the control system 112 is straightforward to implement using bit vector analysis. Also, the control system 112 has a built in backoff period. We say that when the oscillation factor 38 reaches the defined minimum value (say for example 0.00390625), the oscillation factor can be set to 0. When this is done, no change made in the next interval since the change pages will be multiplied by 0. Additionally, if when the oscillation factor 38 is 0 and the bit vector 30 is (0,1,1,0) there will be no change in the next interval as well (since the next bit vector 30 will then be (1,1,0,0) which is "unknown" and thus the oscillation factor 38 will remain 0). This helps that in when the oscillations of the system process 115 are persistent, there will be periods where change will not occur. This back-off period can be extended through the use of longer bit vectors 30 (i.e. increasing the 4 bit patterns to 8 bit patterns will double the minimum backoff period).

Figure 4:
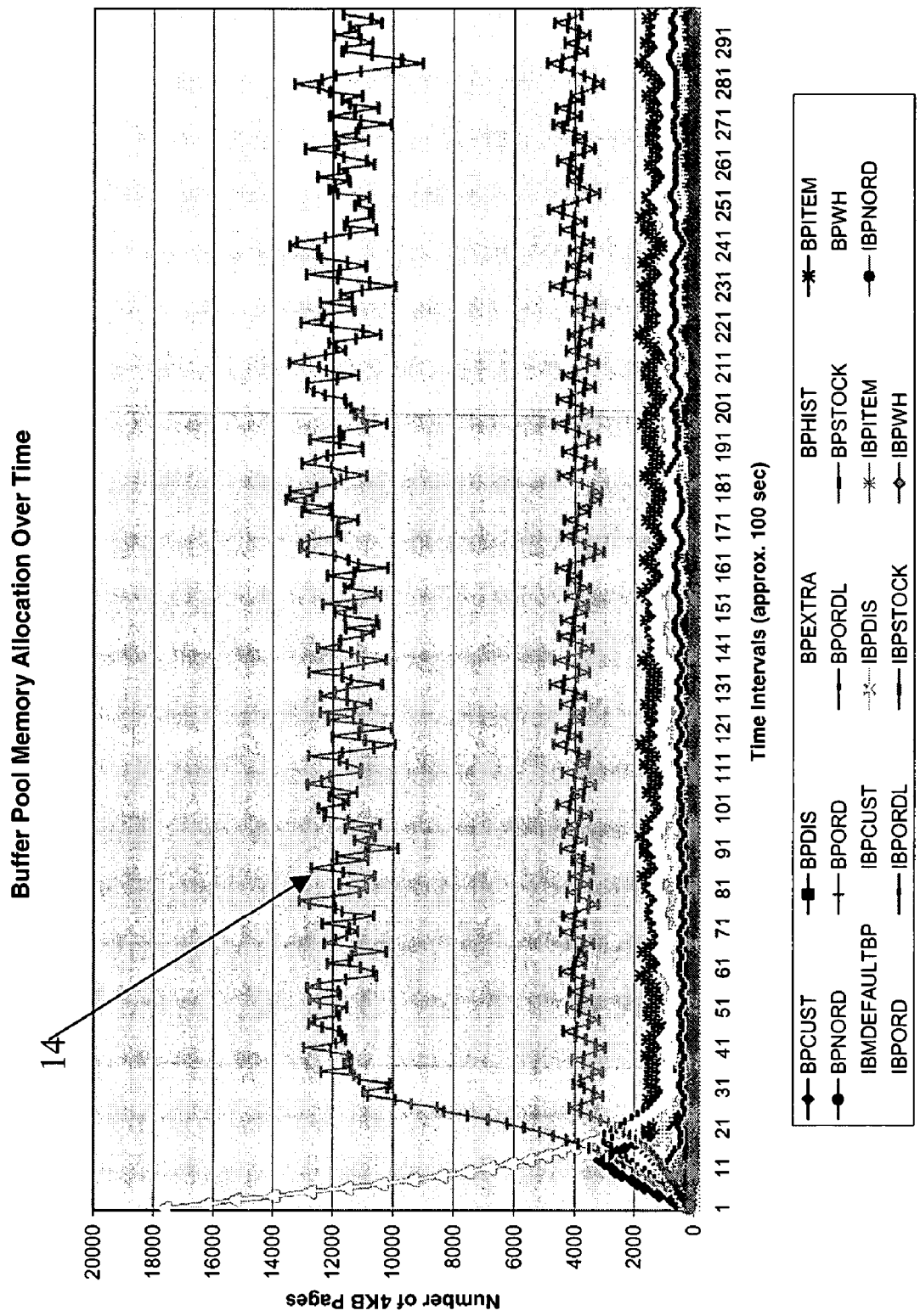
FIG. 4 shows an oscillating solution of the oscillation prone system process of FIG. 2 without application of the control system.
Figure 5:
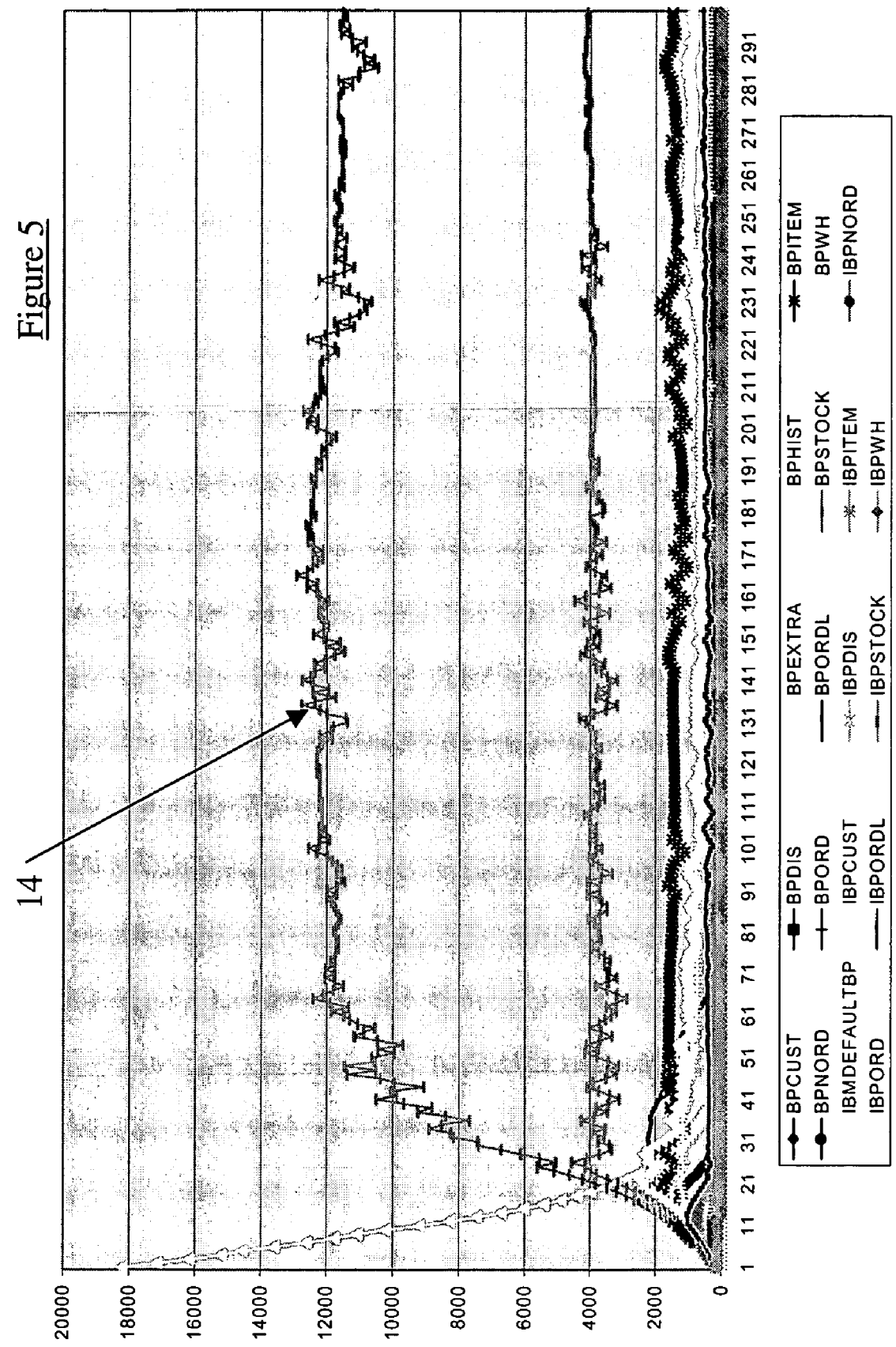
FIG. 5 shows an oscillating solution of the oscillation prone system process of FIG. 2 with application of the control system.

Referring to FIG. 4, an oscillating solution 14 is shown for an example system process 115 over a series of time intervals. The control system 112 was not applied to the behavior of the system process 115. Referring to FIG. 5, the oscillating solution 14 is shown such that the control system 112 was applied to the system process 115, using bit vectors 30 of four bits in length. It should be noted the degree of oscillations have been reduced. We believe that the results could be even further improved with 8 bit or longer bit vectors 30.

Referring to FIGS. 1, 2 and 6, operation 200 of the control system 112 starts S202 by reading S204 the output value 118 from the DMS 114. The control system 112 then assigns the bit value 24 to the output value 118, representing the determined magnitude of change 22, and stores S206 the bit value 24 in the bit vector 30 of the queue 120. Based on a, for example, periodic basis for a lapsed unit of time S208, the comparison module 26 selects S210 a portion of the queue 120 as the bit vector 30 and searches S212 the look-up table 122 for the matching predetermined pattern 124. The comparison module 26 then selects S214 the corresponding adjustment type 126 from the table 122, corresponding to the selected matching pattern 124, and then indicates this adjustment type 126 to the input module 36. The input module 36 determines the oscillation factor 38 corresponding to the selected adjustment type 126 and calculates the adjusted input value 116, which is then sent S216 to the DMS 114 for delivery to the system process 115. The DMS 114 and associated oscillation control system 112 continue to monitor the output values 118 of the system process 115.

It will be appreciated that variations of some elements are possible to adapt the invention for specific conditions or functions. The concepts of the present invention can be further extended to a variety of other applications that are clearly within the scope of this invention. For example, it is recognized that the above-described operations of the various modules 20, 26, 36 can be redistributed or otherwise shared there-between, other than as described, for having the end result of updating the input value 116. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A computer program product comprising a computer readable medium having recorded thereon a computer program to be operatively coupled to a data processing system, the computer program having an internal process configured to read an input value provided by the computer program, the input value adjusting a performance aspect of the internal process, the internal process configured to provide an output value reflecting changes in the internal process responsive to the input value, the output value readable by the computer program, the computer program when executed performs a method for reducing oscillations of the output value, the method comprising: writing the output value to a queue stored in memory of the data processing system; selecting a portion of the queue; matching the selected portion of the queue with a predetermined pattern; selecting a type of adjustment to be made to the input value, the type of adjustment corresponding to the matched predetermined pattern; determining a new input value according to the selected type of adjustment; and providing the new value the internal process, the internal process providing a new output value having reduced oscillations responsive to the new input value.

2. The method of claim 1 wherein a change in the output value is calculated as a magnitude change between the input value and the output value.

3. The method of claim 2 further comprising calculating a first oscillation factor based on selected adjustment types for adjusting the input value.

4. The method of claim 3 further comprising modifying the first oscillation factor in respect to a previous second oscillation factor, the modification selected from one of increased, decreased and unchanged.

5. The method of claim 4 wherein the first oscillation factor has a predefined maximum and a predefined minimum.

6. The method of claim 3 wherein the adjustment types includes one type selected from one of desired, undesired and undecided.

7. The method of claim 6 wherein the queue portion is a bit vector having four bit values representing four magnitude changes between corresponding pairs of the input values and the output values of the system process distributed Over a series of time intervals.

8. The method of claim 2 further comprising selecting a character of the magnitude change from one of increasing, decreasing, and unchanged.

9. The method of claim 8 further comprising assigning a first bit value to the magnitude change when identified as unchanged such that the first bit value is equivalent to a next most recent second bit value in the queue portion.

10. The method of claim 9 wherein the magnitude change when increasing is assigned a first binary value of a binary numbering system.

11. The method of claim 10 wherein the magnitude change when decreasing is assigned a second binary value of the binary numbering system different from the first binary value.

12. The method of claim 11 wherein the magnitude change when unchanged is assigned either the first binary value or the second binary value of the binary numbering system.

13. The method of claim 1 wherein the program is a database management system.

14. The method of claim 13 wherein the internal process exhibits an oscillating behavior towards one or more potential solutions and is selected from the group comprising; memory pools allocation, sorting memory, SQL package memory, locking memory, database operations memory configurations.

15. A computer program product comprising a computer readable medium having recorded thereon a computer program to be operatively coupled to a data processing system, the program having an internal process configured to read an input value provided by the computer program, the input value adjusting a performance aspect of the internal process, the internal process configured to provide an output value reflecting changes in the internal process responsive to the input value, the output value readable by the computer program, the computer program product reducing oscillations of the output value, the computer readable medium encoding computer executable code for directing the data processing system, the computer executable code comprising:

computer executable code for writing the output value to a queue stored in memory of the data processing system; computer executable code for selecting a portion of the queue; computer executable code for matching the selected portion of the queue with a predetermined pattern;

computer executable code for selecting a type of adjustment to be made to the input value, the type of adjustment corresponding to the matched predetermined pattern; computer executable code for determining a new input value according to the selected type of adjustment; and computer executable code for providing the new value the internal process, the internal process providing a new output value having reduced oscillations responsive to the new input value.

16. The computer program product of claim 15 wherein a change in the output value is calculated as a magnitude change between the input value and the output value.

17. The computer program product of claim 16 further comprising computer executable code for calculating a first oscillation factor based on selected adjustment types for adjusting the input value.

18. The computer program product of claim 17 further comprising computer executable code for modifying the first oscillation factor in respect to a previous second oscillation factor, the modification selected from one of increased, decreased and unchanged.

19. The computer program product of claim 18 wherein the first oscillation factor has a predefined maximum and a predefined minimum.

20. The computer program product of claim 19 wherein the adjustment types includes one type selected from one of desired, undesired and undecided.

21. The computer program product of claim 20 wherein the queue portion is a bit vector having four bit values representing four magnitude changes between corresponding pairs of the input values and the output values of the system process distributed over a series of time intervals.

22. The computer program product of claim 16 further comprising computer executable code for selecting a character of the magnitude change from one of increasing, decreasing, and unchanged.

23. The computer program product of claim 22 further comprising computer executable code for assigning a first bit value to the magnitude change when identified as unchanged such that the first bit value is equivalent to a next most recent second bit value in the queue portion.

24. The computer program product of claim 23 wherein the magnitude change when increasing is assigned a first binary value of a binary numbering system.

25. The computer program product of claim 24 wherein the magnitude change when decreasing is assigned a second binary value of the binary numbering system different from the first binary value.

26. The computer program product of claim 25 wherein the magnitude change when unchanged is assigned either the first binary value or the second binary value of the binary numbering system.

27. The computer program product of claim 15 wherein the program is a database management system.

28. The computer program product of claim 27 wherein the internal process exhibits an oscillating behavior towards one or more potential solutions and is selected from the group comprising; memory pools allocation, sorting memory, SQL package memory, locking memory, database operations memory configurations.

* * * * *